United States Patent [19]

Nieman

[11] Patent Number: 5,409,075
[45] Date of Patent: Apr. 25, 1995

[54] PNEUMATIC SUSPENSION SYSTEM FOR FARM EQUIPMENT

[76] Inventor: Donnie L. Nieman, 10847 County Trunk B, Marshfield, Wis. 54449

[21] Appl. No.: 152,306

[22] Filed: Nov. 12, 1993

[51] Int. Cl.⁶ ............................................. B62D 55/00
[52] U.S. Cl. ................... 180/9.5; 180/9.56; 280/711; 280/705; 280/DIG. 1
[58] Field of Search ............... 180/9.5, 9.52, 9.54, 180/9.56; 280/711, 705, 714, DIG. 1, 6.11

[56] References Cited

U.S. PATENT DOCUMENTS

| | | | |
|---|---|---|---|
| 3,012,624 | 12/1961 | Lich | 180/9.54 |
| 3,246,405 | 4/1966 | Reynolds | 180/9.52 |
| 3,254,238 | 6/1966 | Larsen | 280/6.11 |
| 3,774,708 | 11/1973 | Purcell et al. | 180/9.5 |
| 3,826,325 | 7/1974 | Purcell et al. | 180/9.5 |
| 3,828,873 | 8/1974 | Oestmann | 180/9.5 |
| 3,871,462 | 3/1975 | Krolak et al. | 180/9.5 |
| 4,519,654 | 5/1985 | Satzler et al. | 180/9.5 |
| 4,681,177 | 7/1987 | Zborowski | 180/9.56 |
| 4,736,958 | 4/1988 | Armstrong | 280/711 |
| 4,781,257 | 11/1988 | Gee et al. | 180/9.5 |
| 4,783,096 | 11/1988 | Ramsey et al. | 280/711 |
| 4,838,373 | 6/1989 | Price et al. | 180/9.46 |
| 4,881,609 | 11/1989 | Purcell et al. | 180/9.5 |
| 4,898,257 | 2/1990 | Brandstadter | 280/DIG. 1 |

FOREIGN PATENT DOCUMENTS

| | | | |
|---|---|---|---|
| 0583358 | 7/1932 | Germany | 180/9.52 |
| 0196259 | 3/1956 | Germany | 180/9.5 |
| 0595719 | 3/1959 | Italy | 280/DIG. 1 |
| 5085428 | 4/1993 | Japan | 180/9.5 |
| 0640895 | 1/1979 | U.S.S.R. | 180/9.5 |

OTHER PUBLICATIONS

Combines walk through water; by Charlene Finck; Farm Journal, Sep. 1993 pp. 28–29.
Caterpillar Catalog, Challenger 65C/Challenger 75C; 1992.
Caterpillar Catalog, VFS550, 1993.
Cat Product Line Catalog; 1993.
Managing Compaction; Caterpillar Catalog; 1993.
Trade journal ad; Badger Truck, Jul. 1993 pp. 12, 14 and 131.
Introducing CAT's Challenger C Series Tractors with over a dozen new reasons to change; Caterpillar catalog, 1992.

*Primary Examiner*—Margaret A. Focarino
*Assistant Examiner*—Christopher P. Ellis
*Attorney, Agent, or Firm*—Andrus, Sceales, Starke & Sawall

[57] ABSTRACT

A suspension system for tracked vehicles has a plurality of interconnected air bags that is used to more evenly distribute the weight of the vehicle superstructure over the belt track. The more even weight distribution improves floatation of the vehicle over the ground, and reduces instability and wear of the superstructure. A tensioner with a pressurized air bag can be used to increase the tension on the belt track during vehicle operation. The pressure in the tensioner air bag can be reduced to ease the tension on the belt track for efficient servicing.

17 Claims, 3 Drawing Sheets

PNEUMATIC SUSPENSION SYSTEM FOR FARM EQUIPMENT

FIELD OF THE INVENTION

The invention relates to suspension systems for tracked vehicles. A suspension system according to the present invention uses an interconnected pressurized fluid support system to suspend the superstructure of a tracked vehicle above the tracks of the tracked vehicle. The invention is particularly useful on farm equipment, such as combine harvesters, tractors, trailers, or the like.

BACKGROUND OF THE INVENTION

Tracked vehicles normally have an elastomeric or rubber belt mounted around a rear drive wheel and a front idler wheel. In general, tracked vehicles have better traction, than wheeled vehicles, and are thus less likely to get stuck.

Another important advantage of tracked vehicles over wheeled vehicles is that they provide reduced ground pressure per unit area of ground contact. In other words, tracked vehicles have better flotation over the ground on which they are moving. Improved flotation is especially important in farming applications because improved flotation means less ground compaction, which is important for maximizing crop yields. When ground becomes overly compacted, crop yields decline and expensive ripping (i.e., deep plowing) may be needed to sufficiently de-compact the ground so that crop yields can again be maximized. Tracked vehicles reduce ground compaction, and the associated need for expensive ripping because they impact the ground with lower ground pressure per unit area.

Due to improved traction and flotation, tracked vehicles are also useful when crops must be planted or harvested but the fields are too wet for wheeled vehicles.

A prior art suspension system for tracked farm equipment is depicted schematically in FIG. 1. In such a system, there are two track undercarriages: a right-hand side undercarriage 12 and a left-hand side undercarriage 10. The undercarriages are mirror images of one another and provide support for the superstructure 14, which is a tractor in FIG. 1. Each track undercarriage 10 and 12 has a belt side 16 encircling a rear drive wheel 18, a front idler wheel 20, and one or more pairs of mid-wheels 22. Note that the belts 16 have inner ribs 17 that are received in grooves in the front 20 and rear 18 wheels and also between the pairs of mid-wheels 22. This keeps the belt track 16 properly aligned.

A bogie suspension system 24 incorporating an air spring 26 is also located within the belt 16, and is used to suspend some of the weight of the superstructure 14 above the mid-wheels 22. The two front idler wheels 20 are connected in such a manner that they are fixed in relative location with respect to the superstructure 14. The two rear drive wheels 18, on the other hand, are connected by a pivotable axle (like axle 108 shown in FIG. 3). The rear drive wheels 18 are, thus, movable with respect to the superstructure 14. This is useful for driving over rough terrain. The weight of the superstructure 14 is in part supported by the front 20 and rear 18 wheels. The remainder of the weight is supported by a middle suspension bar 30 that extends between the left-hand side and the right-hand side bogie systems 24.

The bogie system 24 as depicted in FIG. 1 has four pairs of mid-wheels 22. The front two pairs of mid-wheels are connected together with a front minor bogie 32 (shown in phantom), and the rear two pairs of mid-wheels are connected with a rear minor bogie 34 (shown in phantom). The minor bogies 32 and 34 are connected together by a major bogie 36 having an air spring 26 on the side of the major bogie 36 towards the front. The major bogie 36 on the right-hand side is connected to the major bogie 36 on the left-hand side by the middle suspension bar (not shown in FIG. 1). A substantial portion of the weight of the superstructure 14 is supported on the suspension bar, while the remainder is supported on the front 20 and the rear 18 wheels.

Such a tracked vehicle can be turned by speeding up the rotation of one track in relation to the other. This is typically done by driving each drive wheel with a separate motor.

Such a suspension system as described above is known to be used to support other superstructures besides, tractors such as combine harvesters. It is also known to use a similar suspension structure (with or without drive motors) as a removable suspension structure, such as a trailer.

One drawback with the above described suspension system for tracked vehicles is that vehicles using such a suspension system tend to bob or teeter in the for and aft directions when driving across rough terrain. This not only has the effect of possibly bouncing the driver around the cab, but also has the effect of substantially increasing ground compaction when weight distribution along the track becomes unevenly distributed.

Another drawback is that such suspension systems are not easily modified to accept one or more additional pairs of mid-wheels. This means that changing the undercarriage so it can accept a longer or shorter belt track is difficult.

In addition, servicing of present track undercarriages is difficult and time consuming, especially when the belt must be removed.

SUMMARY OF THE INVENTION

The present invention is a suspension system for tracked vehicles using a plurality of interconnected bags containing pressurized fluid. If used properly, the suspension system can reduce bobbing and teetering in the fore and aft directions when a tracked vehicle is moving across rough terrain. The suspension system can also improve weight distribution along the tracks and improve flotation of a vehicle using the suspension system.

In one aspect, the present invention is a system for suspending a vehicle superstructure on one or more belt tracks. The system has a ground engaging belt that encircles a front and a rear wheel. The front wheel is mounted to rotate around an axle, and the rear wheel is also mounted to and rotated around an axle. A bridge spans between the axle of the front wheel and the axle of the rear wheel, and is supported in part by the front and rear axles. The bridge can be coupled to and or supported by the front and rear axles by the use of collars around the axles. The system also has a plurality of moveable support members each of which support the bridge on one or more mid-wheels. The mid-wheels are located between the front and rear wheels. A bag holding pressurized fluid is associated with each support member in such a manner that each bag resists motion of the associated support member towards the bridge. The bags are in fluid communication with each other. In this manner, the weight of the superstructure is supported in part by the bridge.

It is preferred that the system also have a tensioner that puts pressure on the belt track to tighten the belt track around the front and rear wheels. The preferred tensioner includes a tension wheel above the bridge that is encircled by the belt track, a tension wheel support arm pivotally connected to the bridge, and a tension pressure bag that can be pressurized to push the tension wheel away from the bridge, put pressure on the belt track, and increase the tension of the belt track.

In another aspect, the invention contemplates using a system as described above for both a right-hand side and a left-hand side belt track on a vehicle. Such a vehicle could be a combine harvester, a tractor, or even a detachable superstructure in which case the invention would include trailers or the like. For unpowered trailers, the superstructure can be suspended on the superstructure at only one location. For powered vehicles, it is preferred that the superstructure be supported on the suspension system at only two locations: the rear axle, and a front support shaft spanning between the bridges of the right-hand side and the left-hand side suspension systems. Preferably, the front support shaft is connected to the bridges using a pneumatic stabilizing suspension system.

It is an object of the present invention to improve the ride of track vehicles over rough terrain. The present invention can accomplish this object by using interconnected air bags to compensate for uneven terrain, and reduce bobbing and teetering. The reduction in bobbing and teetering also helps to reduce ground compaction. Improving the ride of the vehicle also reduces driver fatigue. In addition, improving the ride reduces costly wear of the superstructure and otherwise improves the performance of the vehicle.

Another object of the present invention is to reduce ground compaction caused by tracked vehicles by allowing vehicles to be easily retrofitted with longer belt tracks. Vehicles can be easily retrofitted with longer belt tracks by moving the front wheels forward, and lengthening the bridge between the front and rear wheels.

Another object is to improve vehicle flotation by distributing vehicle weight more evenly along the belt tracks. This object can be accomplished by adjusting air pressure in the interconnected bags so that the weight is properly distributed along the part of the track engaging the ground.

Another object of the present invention is to make servicing of the belt tracks and/or the belt track undercarriages easier and less time consuming. The present invention can accomplish this object because it uses a tensioner that can be easily deactivated to loosen tension on the belt track. Also, servicing the mid-wheels and associated bogeys can be accomplished without removing the belt track by depressurizing the interconnected air bags.

DETAILED DESCRIPTION OF THE PREFERRED EMBODIMENT

Figure 2:
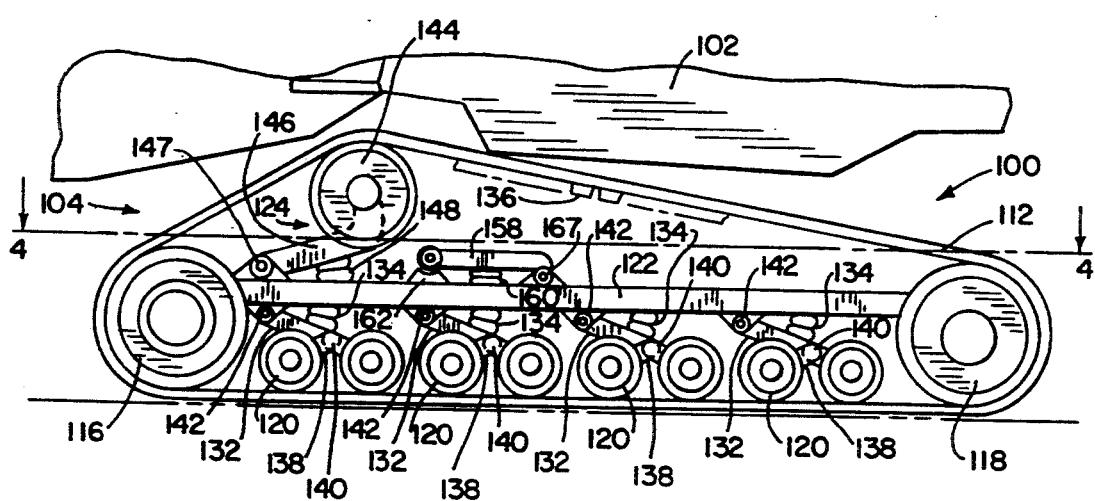
FIG. 2 is a schematic drawing of a suspension system for a tracked vehicle in accordance with the present invention.
Figure 3:
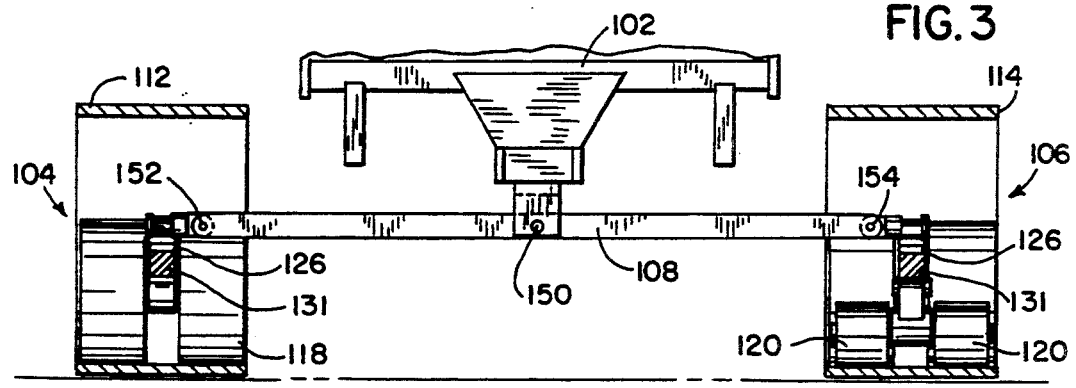
FIG. 3 is a rear view of a preferred suspension system in accordance with the present invention.
Figure 4:
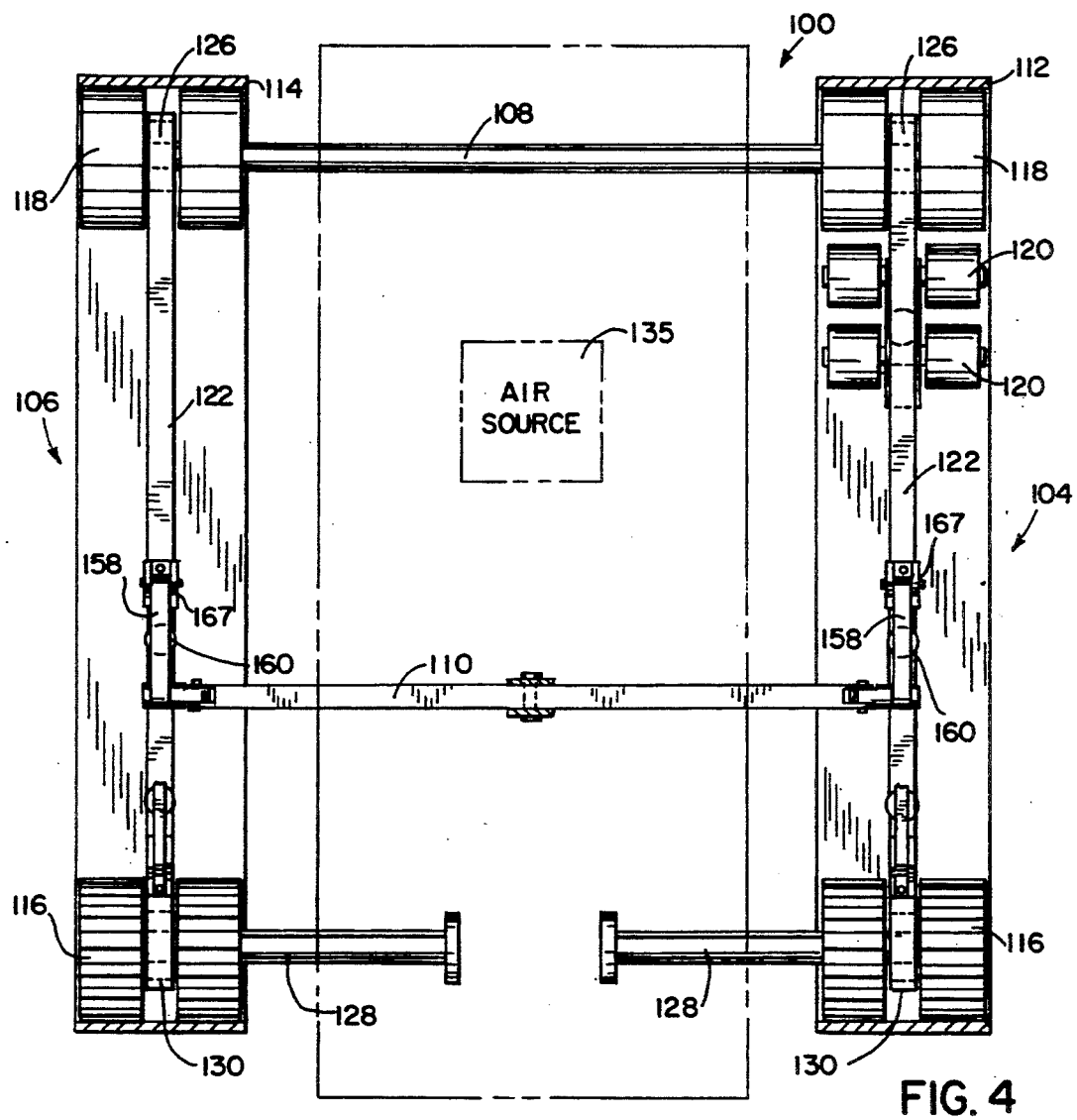
FIG. 4 is a cross sectional taken along line 4—4 in FIG. 2.
Figure 8:
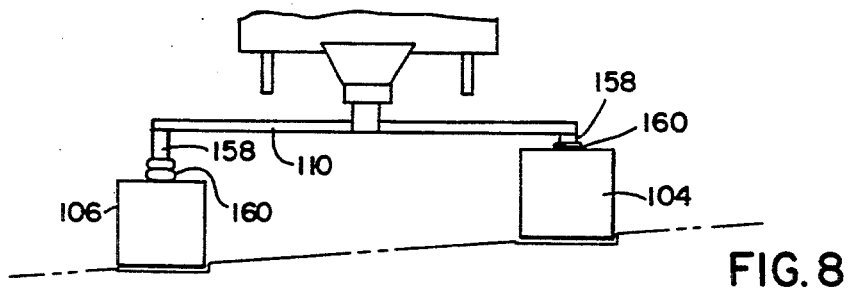
FIG. 8 is a schematic view showing how the suspension system of the present invention can improve the ride of a tracked vehicle over rough terrain in the lateral directions.

Referring to FIG. 2, a suspension system 100 in accordance with the present invention supports a superstructure 102 over a left-hand side undercarriage 104 and a right-hand side undercarriage 106 (shown in FIGS. 3, 4 and 8). It is preferred that the undercarriage 106 for a right-hand side belt track 114 be the mirror image of the undercarriage 104 for a left-hand side belt track 112.

The superstructure 102 is preferably supported on the suspension system 100 at a rear axle 108 (see FIG. 4), and a front support shaft 110 (see FIG. 4). The two-point support structure allows the weight of the superstructure 102 to be evenly distributed over the lengths of the belt tracks 112 and 114. This is because of the position of the superstructure 102 can be adjusted with respect to the position of the front support shaft 110 and the rear axle 108, in such a manner that the weight of the superstructure 102 is evenly distributed along the length of the belts 112 and 114.

The left-hand side undercarriage 104 is now described, and should be understood that it is preferred that the right-hand side undercarriage 106 be the same. Still referring to FIG. 2, the belt track 112 encircles a front idler wheel 116, a rear drive wheel 118, a number of mid-wheels 120 connected to a bridge 122 spanning between the front idler wheel 116 and the rear drive wheel 118, and a tensioner 124 also connected to the bridge 122. In general, the weight of the superstructure 102 is preferably supported by the front support shaft 110 and the rear axle 108, and is distributed along the bridge 122 in such a manner that the ground pressure on the underside of the belt track 112 is even along its entire length.

Referring to FIG. 4, each bridge 122 is connected to the rear axle 108 by a collar 126. Each bridge 122 spans forward to the front idler wheel 116 where it is supported around an axle 128 to which the front wheel is mounted by means of a collar 130. It can be seen in the preferred embodiment that the axles 128 for the front idler wheels 116 are separate from one another. It is preferred that these axles 128 are structured in such a manner that the axle 128 keeps the front idler wheels 116 in a fixed position in respect to the superstructure 102.

Note that the bridges 122 can be made longer or shorter by moving the front 116 and rear 118 wheels further apart or closer together. The length of the bridges 122 can be accommodated by adding additional mid-wheels 120, or by spreading the mid-wheels 120 further apart. Such incremental changes in length is more difficult with the prior art suspension systems.

The bridges 122 are preferably made of steel. It is important that the bridges 122 have a width sufficient to mount the various support members and air bags as is discussed below. Each bridge 122 should also have sufficient strength so that it is completely rigid under the loads expected.

The collars 126 and 130 can be fabricated to be integral with the ends of the bridges 122. It is suggested that bearings 131 (shown in FIG. 3) be used in association with the collars 126 and 130 to facilitate the rotation of axles 108 and 128 in the collars 126 and 130. The bearings 131 should have sufficient strength to support loads on the bridge 122, and it is preferred that the collars/bearing configuration be lubricated with grease or some other lubricant.

As described above, part of the weight of the superstructure 102 is supported on the front support shaft 110 and part is supported on the rear axle 128. Referring again to FIG. 2, this weight is distributed through the bridges 122, which are supported in part by the front 116 and rear 118 wheels that press on the front and rear portions of the belt track 112. The remainder of the weight on the bridges 122 is supported by the mid-wheels 120 that are each connected to the bridge 122 by a support member 132.

Figure 1:
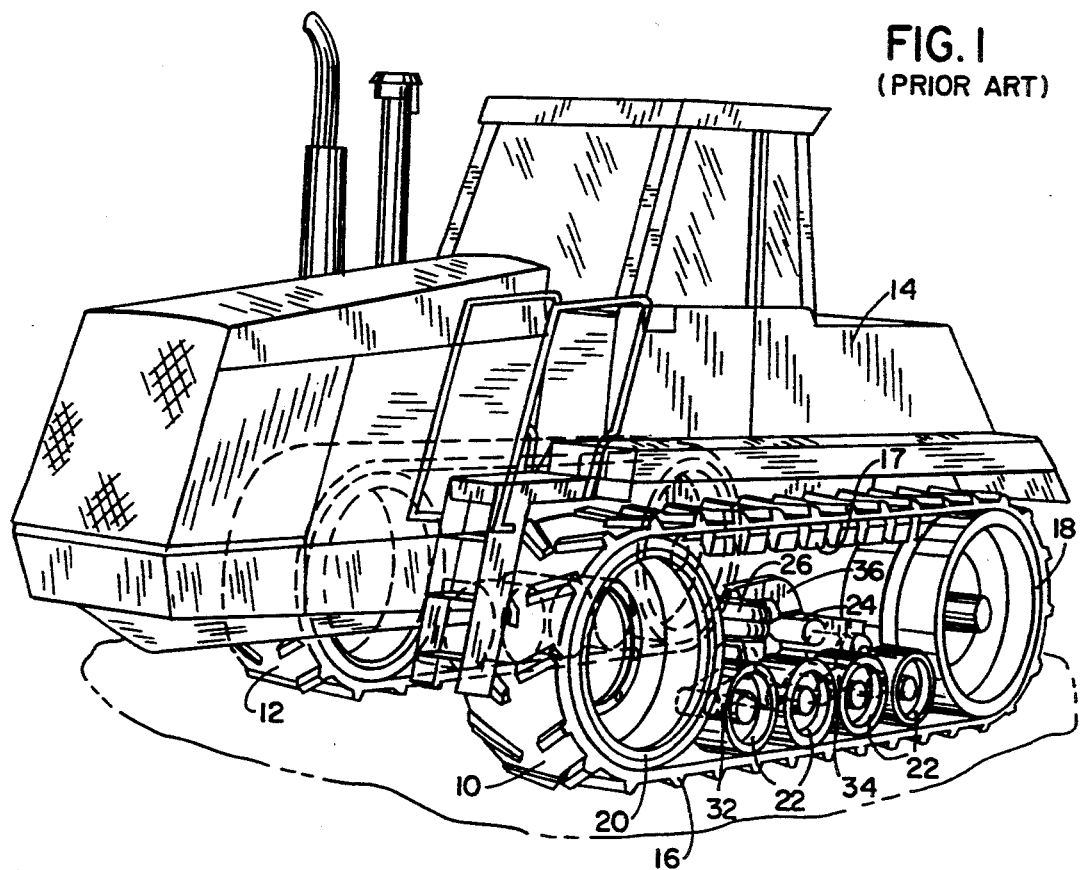
FIG. 1 is a perspective view with parts in phantom showing a prior art suspension system for a tracked vehicle.

It is preferred that the mid-wheels 120 actually be pairs of mid-wheels with the gap therebetween through which ribs 136 on the inside of the belt track 112 can pass. Likewise, it is preferred that both the front 116 and the rear 118 wheels have grooves for accepting the ribs 136. Although not shown in FIG. 2, the ribs 136 preferably run the entire length of the belt track as depicted by ribs 17 in FIG. 1.

Each pair of mid-wheels 120 are preferably connected to another pair of mid-wheels 120 with a minor bogie 138. Minor bogies 138 are known to the industry, and a minor bogie of the type used by Caterpillar, Inc., Peoria, Ill., should be suitable for this application. Briefly, the minor bogies 138 are made of steel, and use collars/bearings on both sides to connect around the axles of the pairs of mid-wheels 120. The minor bogies 138 are concave to increase their strength.

The minor bogies 138 are pivotally connected to an associated support member 132 at a pivot 140. The support members 132 are also pivotally connected to the bridge 122 at a pivot 142. The support members 132 and the pivots 140 and 142 should have sufficient strength to support the weight on the mid-wheels 120. The support member 132 and the pivots 140 and 142 are preferably made of steel.

A bag 134 containing pressurized fluid is located between each support member 132 and the bridge 122. It is preferred that the bags 134 hold pressurized air, although other types of compressible or incompressible fluids can be used. The bags 134 are pressurized to push the support members 132 away from the bridge 122 so that weight being distributed along the bridge 122 can be supported in part by the mid-wheels 120. Air bags 134 can be pressurized using a compressed air supply 35 or an air compressor available to operate other pneumatic devices on a vehicle.

Figure 5:
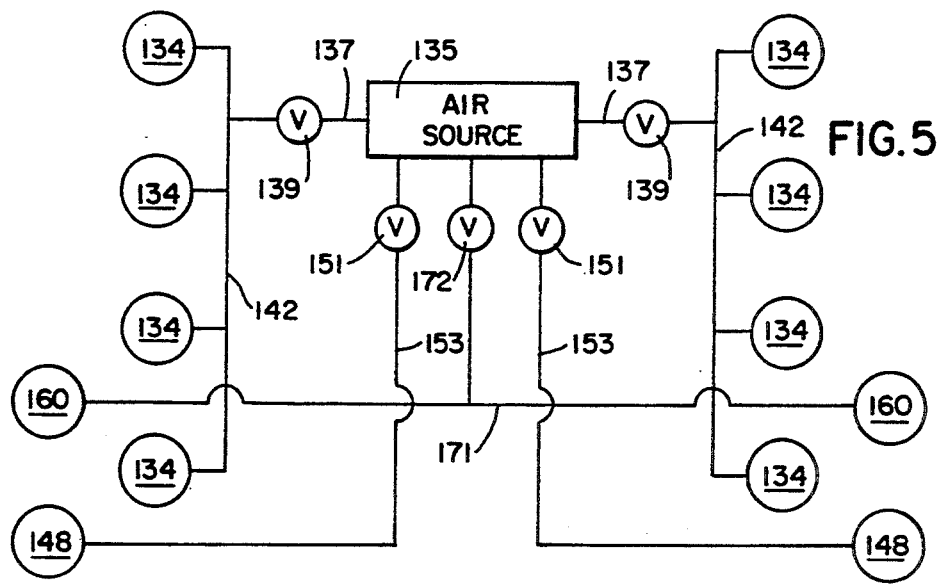
FIG. 5 is a schematic view showing pressurized fluid flow in accordance with the present invention.

Referring to FIG. 5, each of the air bags 134 on a particular bridge 122 are in fluid communication with each other. In FIG. 5, this is accomplished using a conduit 143 that runs between each of the air bags 134 associated with a particular bridge 122. Note that it is preferred that the air bags 134 associated with the right-hand side bridge 122 not be in fluid communication with the air bag 134 of the left-hand side bridge 122, although a system where they are in fluid communication is contemplated by the present invention.

Referring still to FIG. 5, a pressurized air source 135 provides pressurized air to the bags 134 through lines 137. A three-way valve 139 can be located in each line 137. Each three-way valve 139 can be set to a pressurization position to allow pressurized air from the pressurized air source 135 into the air bags 134. When the pressure in the air bags 134 reaches a desired level, each valve 139 can be set from the pressurization position to a closed position to maintain the air pressure within the interconnected air bags 134 and the conduit 143. When it is desired to relieve the air pressure in the interconnected air bags 134, each valve 139 can be set to a pressure release position in which air within the interconnected air bags 134 is released to the atmosphere. Valve means other than a three-way valve 139 can also be suitable for the present invention.

The air bags 134 are preferably made of rubber. Air bags suitable for this application can be purchased from Goodyear. The air bags should be equipped or modified with nipples to receive the conduit 142. The conduit 142 that interconnects the air bags 134 is preferably made of rubber or steel having sufficient strength, and has an internal diameter of about ¾ inch which allows the free circulation of air between the bags 134.

Figure 6:
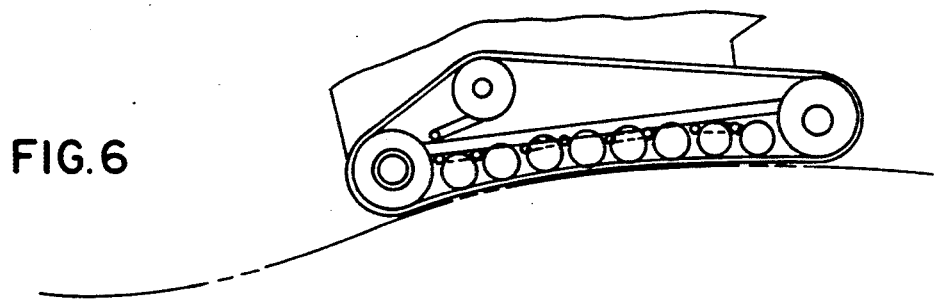
FIGS. 6 and 7 are schematic views showing how the suspension system of the present invention can improve the ride of a tracked vehicle in the fore and aft directions over rough terrain.
Figure 7:
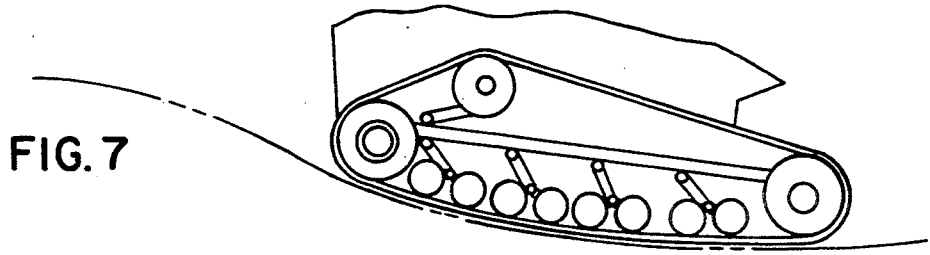

With such an interconnected air bag system, ground pressure along the tracks can be evenly distributed along the belt tracks even when a belt track encounters a bump. This is because air from the compressed air bag will propagate to the other air bags 134, thus forcing the other air bags 134 to bear more weight. However, the weight is now spread over more mid-wheels 120. Also, as depicted in FIGS. 6 and 7, the interconnected air bag system decreases bobbing or teetering of a tracked vehicle in the fore and aft directions when the vehicle travels over hills or valleys. This is primarily because the air bags 134 can contract (FIG. 6) or expand (FIG. 7) while at the same time bearing a portion of the weight on the bridge 122.

Referring again to FIG. 2, a tensioner 124 is used to increase the tension on the belt 112 around the front 116 and rear 118 wheels so that the belt 112 does not slip. The preferred tensioner 124 is located above the bridge 122 and pushes the belt 112 away from the bridge 122. In particular, the preferred tensioner has a tension wheel 144 located above the bridge 122. The tension wheel 144 preferably has a groove to accept ribs 136 on the inside of the belt 112. The tension wheel 144 is pivotally connected to the bridge 122 by a tension wheel support arm 146. The tension wheel support arm 146 is pivotally connected to the bridge 122 at pivot 147. A tension pressure bag 148 is located between the tension wheel support 146 and the bridge 122. The tension pressure bag 148 can be pressurized, preferably with pressurized air, to push against the tension wheel support arm 146 and push the tension wheel 144 away from the bridge 122.

Referring again to FIG. 5, the tension pressure bags 148 are preferably pressurized with air from the pressurized air source 135 through lines 153. A valve 151 can be located in each line 153 for changing, releasing and maintaining air pressure in each tension pressure bag 148. It should be noted that it is preferred that the tension pressure bags 148 not be in fluid communication with each other or any other air or fluid bags.

Using valves, such as valves 151, air can be quickly released from the tension pressure bag 148, and the tension pressure bag 148 can be quickly charged with compressed air. A pneumatic tensioner 124 such as described above is convenient for servicing the belt track 112, or other aspects of the undercarriage which require the belt track 112 to be removed or loosened.

Referring in particular to FIGS. 3, 4 and 8, the present invention also contemplates compensating for rough terrain that is uneven in lateral directions. FIG. 3 is a drawing similar to FIG. 3 in U.S. Pat. No. 4,838,373 which was assigned to Caterpillar Inc., Peoria, Ill., when it issued. In FIG. 3, the superstructure 102 is mounted to the rear axle 108 at a pivot 150 located in the middle of axle 108. The weight of the superstructure 102 is then distributed along the axle 108 to pivots 152 and 154. The weight at 152 is supported by undercarriage 104, and the weight at 154 is supported by undercarriage 106. As a result of this construction, it can be seen that the rear of the undercarriages 104 and 106 can move independently of one another in the vertical direction with respect to superstructure 102 depending on the terrain.

Note that each drive wheel 118 is driven by an independent drive motor (not shown). The independent drive motors are discussed in U.S. Pat. No. 4,838,373, and in particular are shown in FIG. 3 of that patent. The vehicle can thus be turned by increasing the speed one of the belt tracks 112 or 114 with respect to the other belt track 114 or 112 using the independent drive motors.

In FIG. 8, the front support shaft 110 is shown to be maintained relatively level even though the terrain over which the vehicle is moving is not level in the lateral direction. This is accomplished by using a system of moveable stabilizer members 158 and interconnected stabilizer air bags 160. Referring to FIG. 2, the stabilizer support member 158 is pivotally connected to the top of the bridge 122 at pivot 167, and pivotally connected to the front support shaft 110 at its other end. The stabilizer air bag 160 is pressurized so that it will expand when pressure on that side of the support shaft 110 is significantly reduced. The air bag 160 for the left-hand side is connected to the air bag 160 for the right-hand side by a line 171 (See FIG. 5). In FIG. 5, the interconnected stabilizer air bags 160 are pressurized with air from the air source 135, and a valve 172 is used to control the air pressure in the interconnected stabilizer air bags 160. When the pressure on the front support shaft 110 is sufficient to keep the air bag 160 compressed, the front support shaft 110 resides in a saddle 162 on the bridge 122. But, when the force on the front support shaft 110 over the bridge 122 lessens, the air bag 160 will expand thus maintaining the support shaft 110 in a level position (or at least more nearly level) than without such a system (see FIG. 8).

In operation, a suspension system in accordance with the present invention can be used by pressurizing the air bags in the system. Each air bag system (i.e., each midwheel 120 air bag 134 system, front support bar 110 air bag 160 system, and each tensioner 124 air bag 148 system) is pressurized separately. That is, the two tension air bags 148 are each separately pressurized to tighten the belt track 112 and 114. The stabilizer air bags 160 are interconnected to each other and are pressurized together. The set of air bags 134 for the left-hand side undercarriage 104 are interconnected to one another, and are pressurized together. Likewise, the set of air bags 134 for the right-hand side undercarriage 106 are interconnected to one another, and are pressurized together. The stabilizer air bags 160 and the air bags 134 are pressurized an amount to sufficiently support the superstructure. The air pressure in bags 160 or 134 can be adjusted to compensate for the weight of the superstructure 102. In combine harvester applications, for instance, the weight of the superstructure varies during operation because the load increases. Air pressure can be increased as the load increases to properly suspend the system.

Also, as a load accumulates in a combine harvester, the center of gravity moves. For this reason, it is useful to adjust the position of the superstructure 102 with respect to the two-point suspension system so that the load on the belt tracks 112 and 114 can remain balanced. Weight sensors and/or inventory methods can be used to determine whether air pressure or superstructure position should be adjusted, and the amount of any such adjustments.

It is recognized that various equivalents, alternatives, and modifications of the present invention are possible and should fall within the scope of the claims.

I claim:

1. A system for suspending a superstructure on one or more belt tracks, the system comprising:

a rear wheel mounted to an axle for rotation; a front wheel mounted to an axle for rotation;

a ground engaging belt track encircling the front and rear wheels;

a bridge spanning between the axle of the front wheel and the axle of the rear wheel, the bridge being supported in part by the front and rear axles;

a plurality of movable support members, each supporting the bridge in part on one or more midwheels; and a bag that holds pressurized fluid associated with each support member in such a manner that each bag resists motion of the associated support member towards the bridge;

wherein the bags are in direct fluid communication with each other by a conduit member and the weight of the superstructure is supported at least in part by the bridge whereby fluid will freely propagate through said conduit member from a bag that is compressed and into one or more other bags that are not compressed, thus distributing the weight of the bridge more evenly on the support members.

2. A system as recited in claim 1 wherein the pressurized fluid is pressurized air.

3. A system as recited in claim 1 wherein the support members are pivotally connected to the bridge.

4. A system as recited in claim 1 further comprising a tensioner that puts pressure on the belt track to tighten the belt track around the front and rear wheels.

5. A system as recited in claim 4 wherein the tensioner comprises:

a tension wheel located above the bridge and encircled by the belt track; and a tension pressure bag that can be pressurized to push the tension wheel away from the bridge and increase tension on the belt track.

6. An undercarriage system for suspending a superstructure on a right-hand side belt track and on a left-hand belt track, the undercarriage system comprising:

a rear axle extending laterally across the undercarriage system;

a front support shaft located in front of the rear axle and also located laterally across the undercarriage system;

a right-hand side undercarriage having:
   a rear wheel mounted for rotation to the right side of the rear axle,
   a front wheel mounted to an axle for rotation;
   a right-hand side belt track encircling the front and rear wheels and engaging the ground,
   a bridge spanning between the axle of the front wheel and the rear axle, the bridge being supported in part by the axle of the front wheel in the rear axle,
   a plurality of moveable support members, each supporting the bridge in part on one or more mid-wheels,
   a bag that holds pressurized fluid associated with each support member wherein each bag resists motion of the associated support member towards the bridge, the bags are in direct fluid communication with each other by a conduit member and the weight of the superstructure is supported at least in part by the bridge whereby fluid will freely propagate through said conduit member from a bag that is compressed and into the one or more other bags that are not compressed thus distributing the weight on the bridge more evenly on the support member;
   a left-hand side undercarriage that is the mirror image of the right-hand side undercarriage;
   wherein the front support shaft is connected to the bridges of both the right-hand side and left-hand side undercarriages.

7. A system according to claim 6 wherein the suspended superstructure is a combine harvester.

8. A system according to claim 6 wherein the suspended superstructure is detachable from the undercarriage system.

9. A system according to claim 8 wherein the detachable superstructure is supported by the undercarriage system by the front support shaft, and the front support shaft is located towards the middle of the bridges.

10. A system as recited in claim 6 wherein the pressurized fluid is pressurized air.

11. A system as recited in claim 6 wherein each undercarriage further comprises a tensioner that puts pressure on the belt track to tighten the belt around the front and rear wheels.

12. A system as recited in claim 11 wherein the tensioner in each undercarriage comprises:
   a tension wheel located above the bridge and encircled by the belt track; and
   a tension,pressure bag that can be pressurized to push the tension wheel away from the bridge and increase tension on the belt track.

13. A system as recited in claim 6 wherein the right-hand side and the left-hand side bridge each have a saddle in which the front support shaft can sit, and the front support shaft is connected to the left-hand side and the right-hand side bridge with a moveable stabilizer member associated with each bridge, the movable stabilizer members being stabilized in part by a stabilizer bag containing pressurized fluid, wherein the weight of the superstructure is supported in part by each stabilizer bag when the associated front support shaft is not seated in the associated saddle.

14. A system as recited in claim 13 wherein the left-hand side and the right-hand side stabilizer bags are in fluid communication with each other.

15. A system as recited in claim 6 wherein the superstructure is supported by the undercarriage system by the front support shaft and the rear axle only.

16. A method of suspending a superstructure over a belt track that encircles a front wheel, a rear wheel and a plurality of mid-wheels located between the front and rear wheels, the method comprising the steps of:
   supporting the superstructure on a bridge spanning between the front and rear wheels;
   supporting the bridge in part by mid-wheels, wherein the mid-wheels support the bridge on air bags that are directly interconnected by a conduit member and the interconnected air bags are charged with an amount of air sufficient to support the bridge in part; allowing air to freely propagate through said conduit member from an air bag that is compressed and into the one or more other interconnected air bags that are not compressed; and
   adjusting the total air charge in the interconnected air bags as the weight of the superstructure varies so that the weight of the superstructure on the belt track is more evenly distributed along the belt track.

17. A method as recited in claim 16 further comprising the step of moving the center of gravity of the superstructure forward or rearward with respect to the bridge so that the weight of the superstructure is more evenly distributed along the bridge.

* * * * *